(12) United States Patent
Priddle et al.

(10) Patent No.: US 8,923,394 B2
(45) Date of Patent: Dec. 30, 2014

(54) MANAGEMENT OF SLICES

(75) Inventors: Clinton Priddle, Indooroopilly (AU); Rickard Sjöberg, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 377 days.

(21) Appl. No.: 13/144,351

(22) PCT Filed: Jun. 29, 2011

(86) PCT No.: PCT/SE2011/050869
§ 371 (c)(1),
(2), (4) Date: Nov. 9, 2011

(87) PCT Pub. No.: WO2012/011858
PCT Pub. Date: Jan. 26, 2012

(65) Prior Publication Data
US 2012/0287993 A1  Nov. 15, 2012

Related U.S. Application Data

(60) Provisional application No. 61/366,215, filed on Jul. 21, 2010.

(51) Int. Cl.
*H04N 7/32* (2006.01)
*H04N 19/46* (2014.01)
*H04N 19/119* (2014.01)
*H04N 19/70* (2014.01)
*H04N 19/174* (2014.01)
*H04N 19/91* (2014.01)

(52) U.S. Cl.
CPC ... *H04N 19/00545* (2013.01); *H04N 19/00072* (2013.01); *H04N 19/00884* (2013.01); *H04N 19/00272* (2013.01); *H04N 19/00951* (2013.01)
USPC ............ 375/240.12; 375/240.01; 375/240.03; 375/240.24; 375/240.25; 375/240.26

(58) Field of Classification Search
CPC ............... H04N 19/00072; H04N 19/00545; H04N 19/00272; H04N 19/00884
USPC ............ 375/240.12, 240.01, 240.03, 240.24, 375/240.25, 240.26
See application file for complete search history.

(56) References Cited

U.S. PATENT DOCUMENTS 8,654,860 B2 * 2/2014 Huang et al. ............. 375/240.26
2009/0196517 A1 * 8/2009 Divorra Escoda et al. ... 382/240
(Continued)

FOREIGN PATENT DOCUMENTS

WO   WO 2008/027192 A2   3/2008

OTHER PUBLICATIONS
International Search Report, PCT Application No. PCT/SE2011/050869, Dec. 14, 2011.
(Continued)

*Primary Examiner* — Christopher S Kelley
*Assistant Examiner* — Zhihan Zhou
(74) *Attorney, Agent, or Firm* — Myers Bigel Sibley & Sajovec, P.A.

(57) ABSTRACT

A slice (3) of a picture (1) is encoded by hierarchically splitting a largest coding unit, LCU, (10) of the picture (1) into multiple smaller coding units, CUs (20, 30, 40). A start of the slice (3) is defined to coincide with the border between a first CU (30, 40B) and a preceding CU (40, 40A) of the LCU (10). Address information is generated that allows identification of the first CU (30, 40B) within the picture (1) by defining the position of the first CU (30, 40B) and the size of the largest possible CU (30) that can occupy this position within the picture (1). The address information is included in a coded representation (50) of the picture (1). The address information enables positioning slice starts also within LCUs (10), which slice starts thereby do not need to be limited between LCU borders.

27 Claims, 8 Drawing Sheets

(56) References Cited

U.S. PATENT DOCUMENTS

| | | | |
|---|---|---|---|
| 2010/0027680 A1* | 2/2010 | Segall et al. | 375/240.24 |
| 2010/0086029 A1* | 4/2010 | Chen et al. | 375/240.12 |
| 2010/0322317 A1* | 12/2010 | Yoshimatsu et al. | 375/240.24 |
| 2011/0026600 A1* | 2/2011 | Kenji | 375/240.24 |
| 2011/0274162 A1* | 11/2011 | Zhou et al. | 375/240.03 |
| 2012/0014439 A1* | 1/2012 | Segall et al. | 375/240.12 |

OTHER PUBLICATIONS

Written Opinion of the international Searching Authority, PCT Application No. PCT/SE2011/050869, Dec. 14, 2011.

Sjoberg et al. "Fine granularity slices", 3. JCT-VC meeting; 94. MPEG meeting; Oct. 7-15, 2010; Guangzhou; (Joint Collaborative Team on Video Coding of ISO/IECJTC1/SC29/WG11 and ITU-T SG.16); URL: http://wftp3.itu.int/av-arch/jctvc-site/, Oct. 2, 2010; whole document.

Hsu et al. "CE4 Subset1: Leaf-CU-Aligned Slices", 96. MPEG meeting; Mar. 21-25, 2011; Geneva; (Motion Picture Expert Group or ISO/IEC JTC1/SC29/WG11), http://wftp3.itu.int/av-arch/jctvc-site/, Mar. 19, 2011; whole document.

Ugur et al. "High Performance, Low Complexity Video Coding and the Emerging HEVC Standard", IEEE Transactions on Circuits and Systems for Video Technology, Dec. 1, 2010, vol. 20, nr. 12, p. 1688-1697, ISSN 1051-8215; abstract; figure 1; Sections II.A-II.B.

European Search Report Corresponding to Application No. 11809947.2; Dated: Sep. 17, 2014; 9 Pages.

Hannuksela et al. "Improved Coding of Slice Headers", Joint Video Team (JVT) of ISO/IEC MPEG & ITU-T VCEG (ISO/IEC JTC1/SC29/WG11 and ITU-T SG16 Q.6), $3^{rd}$ Meeting: Fairfax, Virginia, USA, May 6-10, 2002, 8 pages.

Hannuksela et al. "Modifications to High-Level Syntax and Semantics", Joint Video Team (JVT) of ISO/IEC MPEG & ITU-T VCEG, (ISO/IEC JTC1/SC29/WG11 and ITU-T SG16 Q.6) $4^{th}$ Meeting: Klagenfurt, Austria, Jul. 22-26, 2002, 11 pages.

Ichimura et al. Matsushita Electric Industrial Co., Ltd., "A Tool for Interactive ROI Scalability", International Organisation for Standardisation Organisation Internationale de Normalisation ISO/IEC JTC1/SC29/WG11 Coding of Moving Pictures and Audio, Contribution to the $74^{th}$ MPEG meeting, Jul. 2005, Poznan Poland, 17 pages.

Ma et al. "High-definition Video Coding with Super-macroblocks", Visual Communications and Image Processing 2007, Proc. Of SPIE-IS&T Electronic Imaging, SPIE, vol. 6508, 650816-1, Jan. 30, 2007, San Jose, 12 pages.

Sjöberg et al. "Fine granularity slices", Joint Collaborative Team on Video Coding (JCT-VC) of ITU-T SG16 WP3 and ISO/IEC JTC1/SC29/WG11, $3^{rd}$ Meeting: Guangzhou, CN, Oct. 7-15, 2010, 4 pages.

Sjöberg R. "CE4 Subset1: Ericsson fine granularity slices", Joint Collaborative Team on Video Coding (JCT-VC) of ITU-T SG16 WP3 and ISO/IEC JTC1/SC29/WG11, $5^{th}$ Meeting: Geneva, CH, Mar. 16-23, 2011, 7 pages.

Wiegand, "Integrated FREXT input draft", 12, JVT Meeting; 69. MPEG Meeting: Jul. 17-23, 2004, Redmond, USA, Joint Video Team of ISO/IEC JTC1/SC29NWG11 and ITU-T SG.16, 39 pages.

* cited by examiner

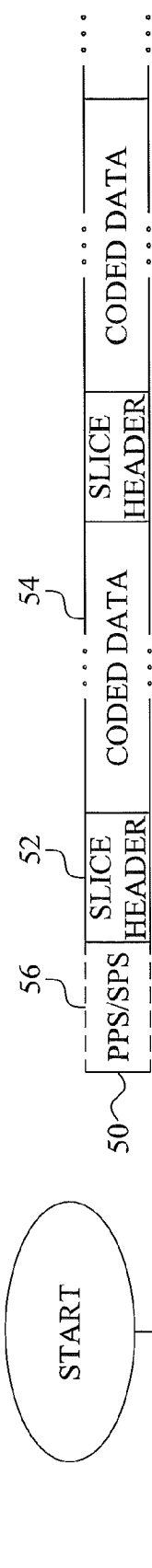
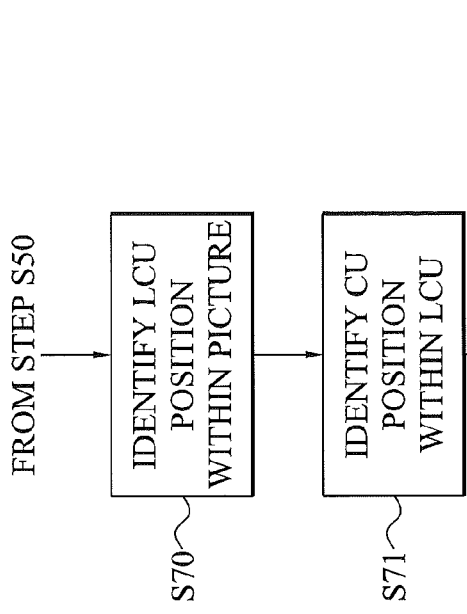
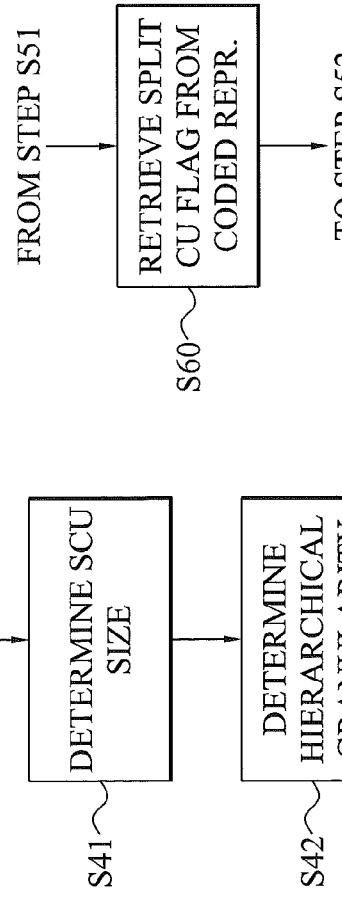
Fig. 8
Fig. 9
Fig. 11
Fig. 12

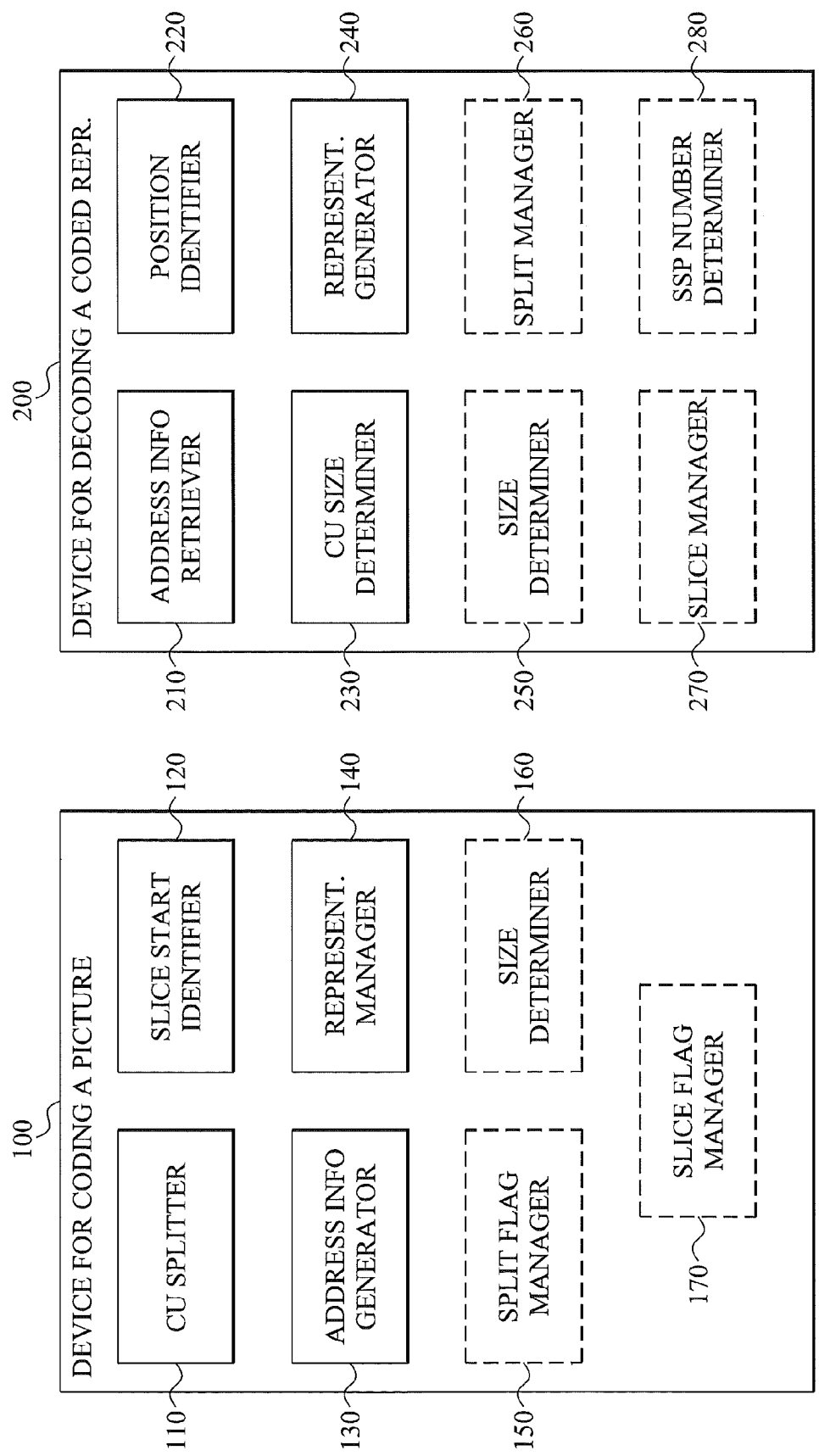

MANAGEMENT OF SLICES

CROSS REFERENCE TO RELATED APPLICATIONS

This application is a 35 U.S.C. § 371 national stage application of PCT International Application No. PCT/SE2011/050869, filed on 29 Jun. 2011, which itself claims priority to U.S. provisional Patent Application No. 61/366,215, filed 21 Jul. 2010, the disclosure and content of both of which are incorporated by reference herein in their entirety.

TECHNICAL FIELD

The present embodiments generally relate to processing of pictures or video frames, and in particular to the management of slices within such pictures or video frames.

BACKGROUND

H.264, also referred to as MPEG-4 (Motion Picture Expert Group) AVC (Advanced Video Coding), is the state of the art video coding standard. It is a hybrid codec that is based on eliminating redundancy between frames, denoted so-called inter coding, and within frames, denoted so-called intra coding. The output of the coding process is VCL (Video Coding Layer) data, which is further encapsulated into NAL (Network Abstraction Layer) units prior transmission or storage.

In H.264/MPEG-4 AVC a picture of a video stream is composed of macroblocks with a fixed size of 16×16 pixels and the coding of the picture proceeds macroblock by macroblock. Each picture of the video stream is divided into one or more slices. A slice is an independently decodable piece of the picture. This means that if one slice of a picture is lost, the other slices of the picture are still decodable. In addition, slices can be used for parallel coding and decoding since they are independent from other slices in the picture. In H.264/MPEG-4 AVC a slice boundary must occur between the border of two adjacent, according to the coding order, macroblocks.

HEVC (High Efficiency Video Coding) is a successor to H.264/MPEG-4 AVC. HEVC aims to substantially improve coding efficiency compared to H.264/MPEG-4 AVC, i.e. reduce the bitrate requirements while keeping the picture quality. HEVC is targeted at next-generation HDTV (High Definition Television) displays and content capture systems which feature progressive scanned frame rates and display resolutions from QVGA (Quarter Video Graphics Array) (320×240) up to 1080p and Ultra HDTV (7680×4320), as well as improved picture quality.

HEVC enables usage of so-called largest coding units (LCUs) that are blocks of pixels having a size that is larger than the macroblocks of H.264/MPEG-4 AVC to provide improved coding efficiency. In order to handle both large homogenous areas and small detailed areas in the same picture a hierarchical coding has been proposed for HEVC. The LCUs in a picture are scanned in a predefined order and each such LCU may be split into smaller coding units (CUs), which in turn may be split hierarchically in a quadtree fashion down to a smallest coding unit (SCU). A picture may, thus, be encoded as a mixture of coding units with different sizes ranging from the LCU size down to the SCU size.

In correspondence to H.264/MPEG-4 AVC a picture of a video stream can be divided into one or more slices in HEVC. The slice boundary is in HEVC aligned with the border of two adjacent, according to a predefined order, LCUs. However, since the LCUs can be at least 16 times larger than the macroblocks in H.264/MPEG-4 AVC the resolution or granularity at where slice borders can be set have actually decreased in HEVC. This can result in slices that are far from being optimally sized for transport mechanisms, such as either too small or too large. Unnecessarily small slices increase the overhead since each slice comes with a certain overhead cost. A too large slice implies that the slice has to be split on the transport level, which results in decreased error resilience since then parts of a slice can be lost in the transmission with the consequence that the slice is not decodable.

There is therefore a need for an efficient management of slices in HEVC and in pictures with large sizes of pixel blocks.

SUMMARY

It is a general objective to provide an efficient management of slices in pictures and video frames.

It is a particular objective to enable slice starts at other picture positions than aligned with borders between largest coding units.

These and other objectives are met by embodiments as disclosed herein.

An aspect of the embodiments defines a method of coding a picture comprising multiple slices and being composed of multiple largest coding units (LCUs) having a selected size in terms of number of pixels. The method comprises hierarchically splitting a LCU of the picture into multiple smaller coding units (CUs) having respective smaller sizes than the LCU size. A start of a slice in the picture is defined to coincide with a border between a first CU and a preceding CU present in the same LCU. The preceding CU precedes the first CU within the LCU according to a defined CU processing order. Address information is generated to allow identification of the first CU. The address information defines a position of the first CU within the picture and the size of a largest possible CU that can occupy this position in the picture. The generated address information is included in a coded representation of the picture.

Another aspect of the embodiments relates to a device for coding a picture. The device comprises a CU splitter configured to hierarchically split a LCU of the picture into multiple smaller CUs. A slice starter of the device is configured to identify the start of a slice in the picture to coincide with a border between a first CU and a preceding CU of the LCU. An address information generator generates address information that allows identification of the first CU. The address information defines the position of the first CU within the picture and the size of a largest possible CU that can occupy this position within the picture. The address information is included by a representation manager in a coded representation of the picture.

A further aspect of the embodiments defines a method of decoding a coded representation of a picture. The method comprises retrieving address information from the coded representation of the picture. The address information is employed to identify the position of a first CU of a slice in the picture. The start of the slice in the picture coincides with a border between the first CU and a preceding CU. The first and preceding CUs are present in the picture within a same LCU and the preceding CU precedes the first CU according to a defined CU processing order. The size of the first CU is determined based at least partly on the retrieved address information, A decoded representation of pixel values of the pixels in the first CU is generated based on the coded representation of the picture and based on the determined size of the first CU.

Yet another aspect of the embodiments relates to a device for decoding a coded representation of a picture. The device comprises an address information retriever configured to retrieve address information from the coded representation of the picture. A position identifier identifies the position of a first CU of a slice in the picture based on the retrieved address information. The start of the slice then coincides with a border between the first CU and a preceding CU belonging to a same LCU in the picture. A CU size determiner of the device determines the size of the first CU in terms of number of pixels based at least partly on the retrieved address information, A representation generator generates a decoded representation of the pixel values of the pixels in the first CU based on the coded representation of the picture and based on the determined size of the first CU.

The embodiments provide an efficient management of slices within pictures and video frames in terms of having a larger freedom when selecting slice start positions within the picture. Thus, slice starts can now be aligned to borders between small coding units and do not have to be aligned with borders between LCUs. This high level of granularity at where slice borders can be positioned enables defining slices that have sizes that are well adapted for the transport mechanism employed to transfer the coded representation of the picture or video frame.

BRIEF DESCRIPTION OF THE DRAWINGS

The invention, together with further objects and advantages thereof, may best be understood by making reference to the following description taken together with the accompanying drawings, in which:

FIGS. 3A and 3B illustrate embodiments of a slice start coinciding with a border between coding units within a LCU;

FIG. 7 is a flow diagram illustrating additional steps of the method in FIG. 1 according to an embodiment;

FIG. 8 is a flow diagram illustrating additional steps of the method in FIG. 1 according to an embodiment;

FIG. 9 schematically illustrates an embodiment of a coded representation of a picture;

FIG. 11 is a flow diagram illustrating an additional step of the method in FIG. 10 according to an embodiment;

FIG. 12 is a flow diagram illustrating additional steps of the method in FIG. 10 according to an embodiment;

FIG. 16 is a schematic block diagram of a device for coding a picture according to an embodiment;

FIG. 17 is a schematic block diagram a device for decoding a coded representation of a picture according to an embodiment.

DETAILED DESCRIPTION

Throughout the drawings, the same reference numbers are used for similar or corresponding elements.

The embodiments generally relate to the management of slices within pictures or video frames. In more detail, the embodiments provide a flexible way with high granularity to define the start of a slice within a picture or video frame. The embodiments are applicable to picture coding and decoding which utilize hierarchical splitting of blocks of pixels into smaller blocks of pixels. The embodiments are therefore well suited to be used in connection with High Efficiency Video Coding (HEVC) but are not limited thereto.

Figure 2:
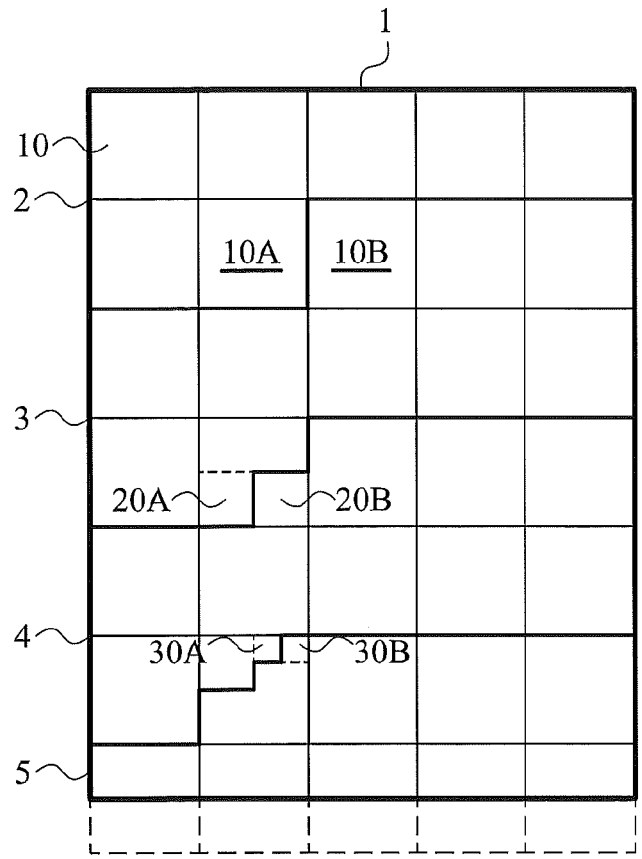
FIG. 2 illustrates an embodiment of a picture divided into multiple slices and comprising multiple largest coding units (LCUs)

With reference to FIG. 2, according to an embodiment, a picture 1, such as of a video frame in a video stream, can be divided into a number of largest coding units (LCUs) 10, also denoted largest coding tree blocks (LCTBs) or largest coding blocks (LCBs) in the art. The LCU 10 is the largest possible block of pixels that can be handled during encoding and decoding, and can be processed, for instance, according to the well known intra or inter encoding/decoding modes. The LCU 10 can in turn be hierarchically split into a number of smaller, in terms of number of pixels, blocks of pixels, typically denoted coding units (CUs) 20A, 20B, coding tree blocks (CTBs) or coding blocks (CBs). These CUs 20A, 20B may in turn be split further into even smaller blocks 30A, 30B of pixels in a hierarchical manner down to a smallest possible block of pixels, denoted smallest coding unit (SCU) smallest coding tree block (SCTB) or smallest coding block (SCB).

In clear contrast to the prior art techniques that limit the positioning of the start of slice 2, 3 in a picture 1 to be aligned with the border between two adjacent LCUs 10A, 10B, the present embodiments provides a much more flexible positioning by enabling the start of the slice 4, 5 to be aligned with the border between any adjacent CUs 10A, 10B, 20A, 20B, 30A, 30B, preferably regardless of the size of the CU. Hence, it is then possible that the slice start will be positioned inside an LCU with the last CU of the preceding slice and the first CU of the current slice in the same LCU.

According to the embodiments, "slice" is employed to denote an independently codable and decodable portion of a picture or video frame. A picture can thereby be composed of a single slice or multiple, i.e. at least two, slices.

Figure 1:
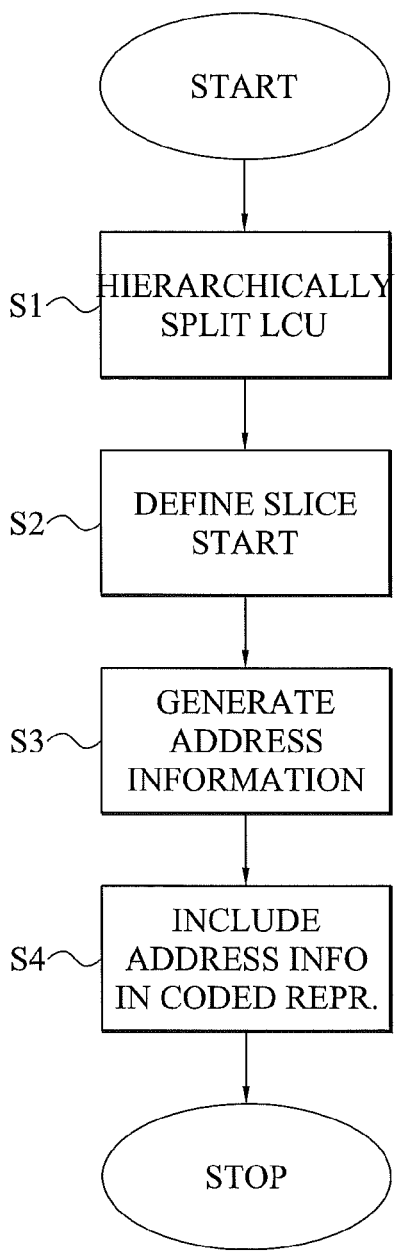
FIG. 1 is a flow diagram illustrating a method of coding a picture according to an embodiment.

FIG. 1 is a flow diagram illustrating an embodiment of a method of coding a picture. The picture 1 comprises, as illustrated in FIG. 2, multiple LCUs 10 having a selected size in terms of number of pixels. This means that each LCU 10 of the picture 1 preferably has the same number of including pixels. The LCUs 10 could be rectangular but are preferably quadratic, i.e. comprises M×M pixels, where M is a defined positive integer equal to or preferably larger than two and preferably $M=2^m$, where m is a positive integer. Non-limiting examples of suitable values of M is 64 or 128.

The method starts in step S1 where an LCU of the picture is hierarchically split into multiple CUs, where each of these multiple CUs have a respective size in terms of number of pixels that is smaller than the selected size of the LCUs. In an embodiment, the start of a slice in the picture is defined in step S2 to coincide with a border between a first CU and a preceding CU within this LCU.

Figure 4:
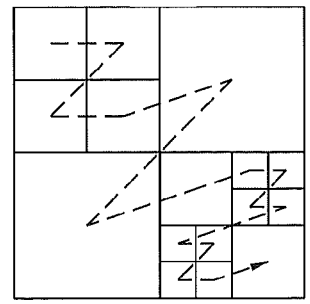
FIG. 4 schematically illustrates an embodiment of a coding and decoding order for processing coding units.

The preceding CU precedes the first CU within the LCU according to a defined processing order. This processing order dictates the order at which CUs are processed during the encoding and/or decoding process. Various such processing orders are available and can be used according to the embodiments. An example of such a processing order is the raster scan order. The raster scan order is generally from left to right and from top to bottom. The raster scan order is typically employed when processing LCUs during encoding and decoding. Another example of a processing order that can be used according to the embodiments is a coding/decoding order denoted the Z-order or Morton order. FIG. 4 schematically illustrates this concept of Morton order. In such a case, the CUs of the LCU are processed in a Z-pattern as illustrated in the figure. The proceeding CU with regard to the first CU is then the CU that precedes the first CU in the LCU when traveling along the multiple CUs of the LCU in the defined processing order.

The processing order is defined, implying that for a given picture one and the same processing order is employed for processing CUs that are split from a LCU. Note, though, that the processing of LCUs can be performed according to another processing order than the processing of the CUs that are hierarchically split from a LCU. For instance, a picture can be processed, such as coded or decoded, by traveling from LCU to LCU according to the raster scan order. However, the processing, such as coding or decoding, of CUs that are hierarchically split from one such LCU could then be processed according to the Morton order. Other known coding/decoding orders can be used according to the embodiments instead of or together with the above mentioned examples A next step S3 of the coding method in FIG. 1 generates address information allowing identification of the first CU and thereby the start of the slice. According to the embodiments, the address information defines a position of the first CU within the slice and in the picture and also defines a size in terms of number of pixels of a largest possible CU that potentially can occupy the defined position in the picture. The largest possible CU is thus the maximum CU that can start on the position defined by the address information given the layout of LCUs in the picture and the particular split design, i.e. the hierarchical splitting into smaller CUs.

The position of the first CU within the picture as defined by the address information can be according to various embodiments. In an embodiment, the address information could specify the coordinates within the picture of the first pixel in the first CU. However, such an embodiment is typically not that efficient since it implies comparatively long addresses. For instance, a picture of size 1280×960 pixels would then have 1228800 different pixel coordinates and requiring 21-bit long addresses assuming fixed length coding (FLC). Another solution is not to use coordinates that are pixel based but rather use units of SCU size. This leads to shorter addresses and avoids being able to encode coordinates of CUs which are not possible. For instance, assume that the size of the SCUs is 8×8 pixels. The above exemplified picture would then consist of 19200 SCUs. The number of bits required to encode the coordinates of the position of a CU would then be 15 bits with FLC.

In some embodiments, as is further discussed herein, the hierarchical splitting could have a limited granularity implying that the start of a slice is prevented from being aligned with a SCU but can be aligned with larger CUs from the LCU size down to a level in the hierarchical splitting that is above the SCU size. In such a case, the coordinates could use units of the size of CU at the level above the SCU. For instance, the size of the SCU is 8×8 pixels but the hierarchical granularity defines that the slice start positions can only be aligned with CUs at a size equal to or larger than a smallest possible CU or addressable CUs of 16×16 pixels. In such a case, there are 4800 possible slice start positions if the picture has the above mentioned example size.

It is of course possible to handle the x- and y-coordinates of the position of the first CU separately. The address information then comprises information of the x-coordinate and information of the y-coordinate.

The address information not only defines the position of the first CU and thereby the start of a slice but additionally defines the size of the largest possible CU that can occupy the position in the picture defined by the address information. This means that this size is dependent on the position as determined by the address information. Though, the address information gives the size of the largest possible CU that can occupy the position, the size of the first CU does not need to be equal to the size of this largest possible CU that can occupy the position. FIGS. 3A and 3B illustrate this concept. In the figures reference numbers 2, 3 denote two different slices in a picture and the bold line defines the border between the two slices 2, 3. The slice border occurs in these examples within the area of the picture occupied by a LCU 10. Reference number 20 denotes a CU obtained for a granularity of 1 when the LCU 10 is hierarchically split into four CUs 20. With a granularity of 2 a CU 20 can be hierarchically split into four smaller CUs 30. In FIGS. 3A and 3B showing a case with a granularity of 3 a CU 30 can be split into four SCUs 40.

In FIG. 3A the first CU of the slice 3 is referenced by 30, whereas in FIG. 3B it is referenced by 40B. The reference numbers 40 (FIG. 3A) and 40A (FIG. 3B) denote the preceding CU of the LCU 10 according to the defined processing order, which in this example is the Morton order. In both FIGS. 3A and 3B the start of the slice and the position of the first CU 30, 40B are the same though the first CU 30, 40B have different sizes in the two examples. The address information is, however, typically the same in both these cases and the size of the largest possible CU 30 that can occupy the relevant position is the same. The two cases can, as will be further described herein, be differentiated by complementing the address information with additional information in terms of so-called split coding unit flags.

A final step S4 of the method illustrated in FIG. 1 involves including the address information generated in step S3 in a coded representation of the picture. The coded representation thereby comprises address information that can be used during decoding in order to identify the start of slice occurring inside a LCU. The coded representation additionally comprises coded picture data generated according to well known coding techniques, such as defined by HEVC and inter and intra coding modes. This coded picture data comprises coded representations of the pixel values of the pixels in the slices of the picture.

If the picture comprises more than two slices, the method of steps S1 to S4 are preferably performed for each additional slice in the picture to thereby generate respective address information defining the start of the slices and the positions of the respective first CUs of these slices in the picture. However, the starts of the slices in the picture do not all have to be on the same granularity level. For instance, a slice start position of one slice could be aligned with a CU inside an LCU, whereas the slice start position of another slice in the picture could be aligned with an LCU as in the prior art. FIG. 2 schematically illustrates this. The border between a first slice 2 and a second slice 3 coincide with the border of two adjacent, according to the processing order, LCUs 10A, 10B. The border between the second slice 3 and a third slice 4 is instead aligned with the border of two coding units 20A, 20B that are each one quarter in size as compared to on LCU 10. Correspondingly, the border between the third slice 4 and a fourth slice 5 is in FIG. 2 aligned with the border of two CUs 30A, 30B, each 1/16 in size as compared to an LCU 10.

Figure 5:
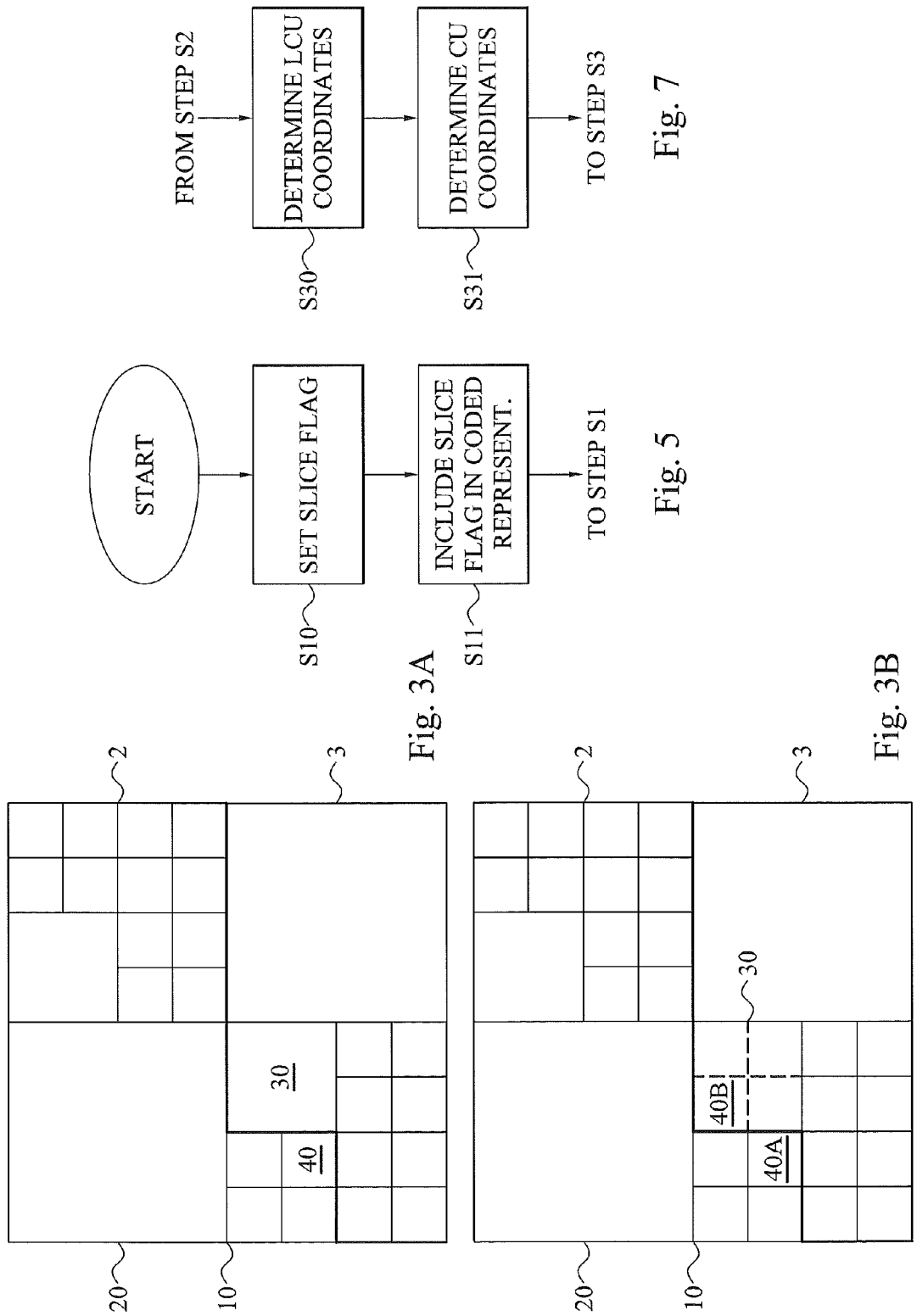
FIG. 5 is a flow diagram illustrating additional steps of the method in FIG. 1 according to an embodiment.

FIG. 5 is a flow diagram illustrating additional, optional steps of the method in FIG. 1. As discussed in the foregoing, a picture can consist of a single slice or multiple slices. The usage of address information in order to identify the start of slices is, however, only of relevance if the picture comprises multiple slices. It can therefore be advantageously to differentiate pictures consisting of a single slice and pictures consisting of multiple slices. It is only for the latter that address information need to be generated and later, during decoding, used. In the optional step S10 a slice flag is therefore set to a value to indicate whether the picture comprises a single or multiple slices. In a particular embodiment, the value of the slice flag is set to a first value, such as $1_{bin}$ or a logical one or any other defined symbol, if the picture comprises multiple slices and is otherwise set to another value, such as $0_{bin}$ or a logical zero or any other defined symbol. A next step S11 includes the slice flag in the coded representation of the picture. This slice flag can alternatively be included in a picture parameter set (PPS) or sequence parameter set (SPS) that is included in or associated with the coded representation. The method then continues to step S1 if the slice flag was set to one or otherwise ends by generating the coded pixel data for the coded representation of the picture but without any address information for the present slice.

Figure 6:
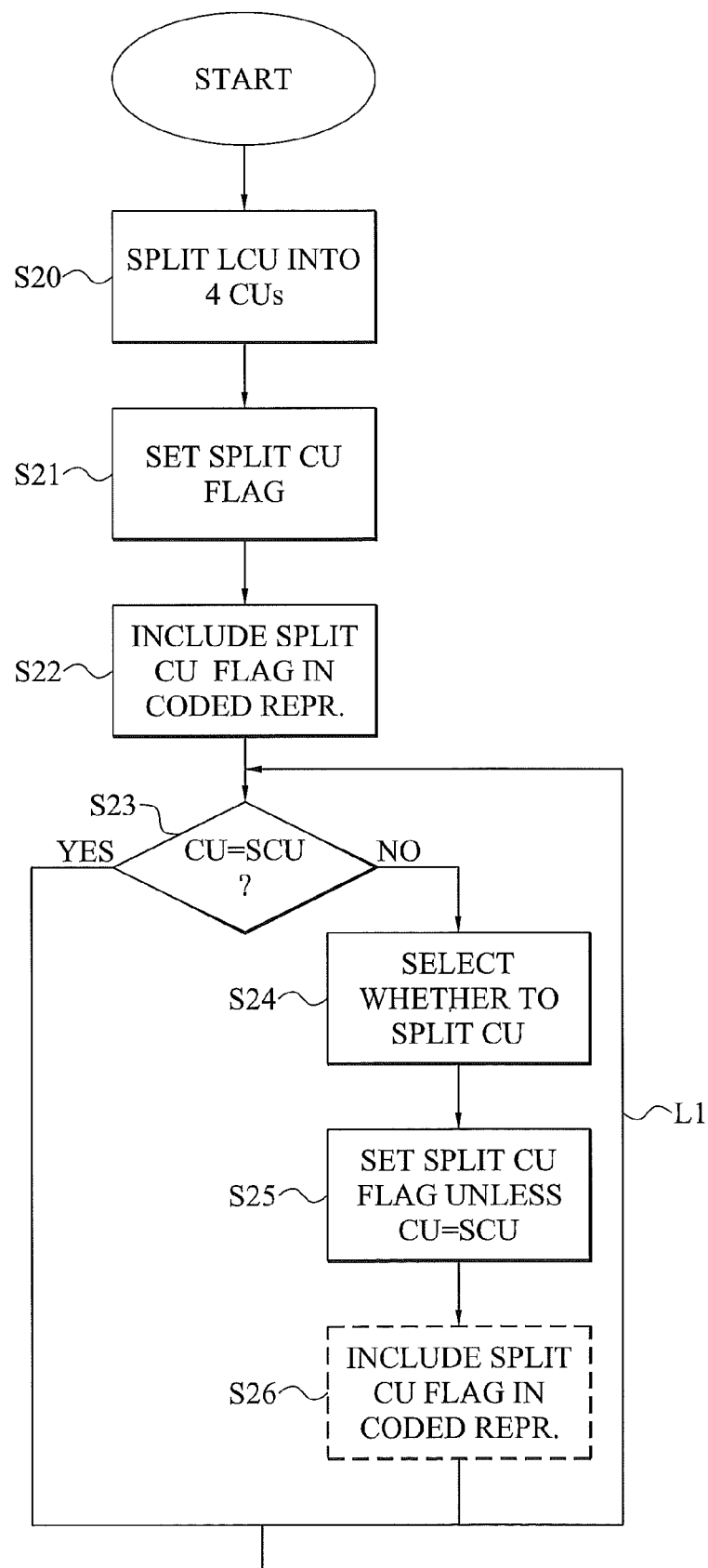
FIG. 6 is a flow diagram illustrating an embodiment of hierarchically splitting a LCU in FIG. 1.

FIG. 6 is a flow diagram illustrating an embodiment of hierarchically splitting the LCU of FIG. 1. In this embodiment hierarchically splitting the LCU comprises splitting the LCU in a quadtree fashion. As is well known in the art, a quadtree is a tree data structure in which each internal node has exactly four children. Hierarchically splitting the LCU thereby implies partitioning the two dimensional space of the picture occupied by the LCU by recursively subdividing it into four quadrant or regions, denoted CUs herein. In a preferred embodiment, the recursively splitting involves division into four equally sized CUs. Thus, in step S20 the LCU is split into four equally sized CUs, each of which thereby has a size in terms of number of pixels that is quarter of the size of the LCU. A next preferred step S21 sets a so-called split coding unit flag associated with the LCU to a defined value indicating that the LCU is hierarchically split into multiple, preferably four, CUs. In a particular embodiment, the split coding unit flag is set to a value of $1_{bin}$ or a logical one or any other defined symbol in step S21 to signal the split of the LCU in step S20. The split coding unit flag associated with the LCU is then included in the coded representation of the picture in step S22. Correspondingly, if a LCU is not split the split coding unit flag is instead set to $0_{bin}$ or a logical zero or any other defined symbol.

The CUs into which the LCU is split are then processed individually. As previously discussed the smallest possible CU is the so-called SCU. Such a SCU cannot be further hierarchically split but instead constitutes the smallest block of pixels that can be encoded and decoded. The optional step S23 thereby investigates whether a current CU is a SCU and can therefore not be further split. If not the method continues from step S23 to step S24. Step S24 selects whether to recursively split the CU into further, preferably four CUs, preferably of equal size. This selection whether to split a CU further is based on the coding process. For instance, a picture area that represents a fairly homogenous background is more efficiently represented using large CU sizes as compared to splitting the picture area into smaller CUs. However, picture areas with small details or a lot of such details can generally not be correctly represented if using a large CU. In such a case, it is more efficient and preferred from coding quality point of view to use several smaller CUs for the picture area. The selection of whether to further split a CU can thereby performed according to techniques described in the art and preferably based on the coding efficiency and quality.

If the CU is split as selected in step S24 a split coding unit flag associated with the CU is set in step S25 to a defined value, preferably $1_{bin}$ or a logical one or any other defined symbol, otherwise, i.e. the CU is not split, the split coding unit flag is set to another defined value, preferably $0_{bin}$ or a logical zero or any other defined symbol. No split coding unit flag is needed for the CUs that are SCUs as indicated in FIG. 6. The split flag is then included in the coded representation of the picture in step S26.

The loop of steps S23 to S26 is then repeated for each CU and for each level or granularity of the quadtree until no further splitting of CUs is beneficial from coding efficiency and quality point of view or until the lowest level has been reached and a CU cannot be further split.

The method then continues to step S2 of FIG. 1.

Applying this technique of hierarchical, splitting CUs and setting split coding unit flag to the embodiments of FIGS. 3A and 3B implies that in FIG. 3A the first split coding unit of the slice 3 is set to zero in FIG. 3A since the size of the first CU 30 is equal to the size of the largest possible CU that can occupy the position in the picture defined by the generated address information.

In clear contrast, in the embodiment of FIG. 3B the first split coding unit flag of the slice 3 is set to one since the size of the first CU 40B is smaller than the size of the largest possible CU 30 that can occupy the position in the picture defined by the generated address information.

If the size of the first CU in the slice would have been equal to the size of the SCU and also equal to the size of the largest possible CU that can occupy the position in the picture defined by the generated address information, no split coding unit flag will be associated with the first CU and thereby does not need to be included in the coded representation of the picture.

In an example assume that the size of a LCU is 128×128 pixels and a corresponding size of a SCU is 16×16 pixels. Further assume that the LCUs 10 of FIGS. 3A and 3B consists of two slices 2, 3 then the coded representation could be defined as:

Slice_header_syntax( ) // slice 2 in FIG. 3A
split_coding_unit_flag=1 // split 128×128 LCU into four 64×64 CUs
split_coding_unit_flag=0 // first 64×64 CU is not split further
    code of first 64×64 CU // the coded representation of the pixel values of the first 64×64 CU
split_coding_unit_flag=1 // split second 64×64 CU into four 32×32 CUs
split_coding_unit_flag=0 // first 32×32 CU is not split further
    code of first 32×32 CU // the coded representation of the pixel values of the first 32×32 CU
split_coding_unit_flag=1 // split second 32×32 CU into four SCUs, no further split coding unit flags are needed
    code of first SCU // the coded representation of the pixel values of the first SCU
    code of second SCU // the coded representation of the pixel values of the second SCU
    code of third SCU // the coded representation of the pixel values of the third SCU
    code of fourth SCU // the coded representation of the pixel values of the fourth SCU split_coding_unit_flag=1 // split third 32×32 CU into four
    SCUs, no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=1 // split fourth 32×32 CU into four
    SCUs, no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=1 // split third 64×64 CU into four
    32×32 CUs
split_coding_unit_flag=1 // split first 32×32 CU into four
    SCUs, no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of preceding CU 40 in FIG. 3A
Slice_header_syntax( ) // slice 3 in FIG. 3A
split_coding_unit_flag=0 // split coding unit flag of first CU is
    set to 0 since the size of the first CU is equal to the size of
    the largest possible CU that can occupy the position in the
    picture defined by the generated address information.—
    The largest possible CU at this address is 32×32 and no
    split flags splitting down to 32×32 are needed. Instead the
    size 32×32 is derived from the address and the granularity.
  code of first CU // the coded representation of the pixel
      values of the CU 30 in FIG. 3A
split_coding_unit_flag=1 // split 32×32 CU into four SCUs,
    no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=1 // split 32×32 CU into four SCUs,
    no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=0 // no further split of 64×64 CU
  code of 64×64 CU // the coded representation of the pixel
      values of the first 64×64 CU In the embodiment illustrated in FIG. 3B the code for the first slice 2 would be the same as above, whereas for the second slice 3 the code would instead become:
Slice_header_syntax( ) // slice 3 in FIG. 3B
split_coding_unit_flag=1 // split coding unit flag of first CU is
    set to 1 since the size of the first CU is smaller than the size
    of the largest possible CU that can occupy the position in
    the picture defined by the generated address information,
    no further split coding unit flags are needed.
  code of first CU // the coded representation of the pixel
      values of the first CU 40B in FIG. 3B
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=1 // split 32×32 CU into four SCUs,
    no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=1 // split 32×32 CU into four SCUs,
    no further split coding unit flags are needed
  code of first SCU // the coded representation of the pixel
      values of the first SCU
  code of second SCU // the coded representation of the pixel
      values of the second SCU
  code of third SCU // the coded representation of the pixel
      values of the third SCU
  code of fourth SCU // the coded representation of the pixel
      values of the fourth SCU
split_coding_unit_flag=0 // no further split of 64×64 CU
  code of 64×64 CU // the coded representation of the pixel
      values of the first 64×64 CU The address information generated in the method of FIG. 1 and that allows identification of the first CU in the slice can, as previously discussed, define the coordinate or X- and Y-coordinates of the first CU within the picture. The coordinate(s) is(are) then relative an origin, typically the upper left corner of the picture. However, other predefined origins could be employed, such as upper right corner, lower left corner or lower right corner of the picture.

In a particular embodiment as illustrated in FIG. 7, the address information comprises or allows generation of two address parts or coordinate representations. The method steps of FIG. 7 continue from step S2 in FIG. 1. A next step S30 determines the coordinates of the position of the LCU in which the first CU and thereby the start of the slice is present. These coordinates are relative a global origin defined for the picture, such as upper left corner. A next step S31 determines the coordinates of the position of the first CU within the LCU. These coordinates are then relative a local origin defined for the LCU, such as upper left corner.

The method then continues to step S3 of FIG. 1, where the address information is generated based on the coordinates determined in steps S30 and S31. In a particular embodiment, a first representation of the coordinates determined in step S30 is generated. For instance, a picture of 1280×960 pixels and a LCU size of 64×64 pixels implies that the picture comprises 300 LCUs, thereby requiring a 9-bit first representation to indicate the particular LCU within the picture. A corresponding second representation of the coordinates determined in step S31 is also generated. If the SCU size is 8×8 pixels and the slice start positions can be aligned to SCU borders then an LCU comprise 64 slice start positions and the second representation is thereby a 6-bit representation to indicate the particular position of the first CU within the LCU. The address information could then comprise these two coordinate representations. In an alternative embodiment the address information is generated so that the coordinates determined in steps S30 and S31 can, during decoding, be generated or calculated from the address information. The address information of the embodiments could be a fixed length representation. In the previous discussed examples such fixed length representations have been used. An alternative would be to use a variable length representation. An example of a variable length code that can be used is the universal variable length coding (UVLC) as mentioned in Lee and Kuo, Complexity Modeling of H.264/AVC CAVLC/UVLC Entropy Decoders, IEEE International Symposium on Circuits and Systems (ISCAS2008), 2008, pp. 1616-1619. Briefly, UVLC uses Exp-Golomb (EG) code. The EG code for an unsigned integer value C is [P zeros][1][info], where P=floor($\log_2$(C+1)) and info=C+1−$2^P$.

FIG. 8 is a flow diagram illustrating additional steps of embodiments of a method of coding a picture. In an embodiment, the size of the LCUs in the picture could be predefined and thereby known to the encoder and the decoder. For instance, the LCU size could be 128×128 pixels or 64×64 pixels. No determination or signaling of the LCU size is thereby needed. Correspondingly, the size of the SCUs in the picture could be predefined. Examples of such fixed and predefined SCU sizes that can be employed are 16×16 pixels or 8×8 pixels.

In alternative embodiments, the encoding process may additionally determine the LCU size and/or the SCU size to employ for the current picture. This could be beneficial to thereby adapt these LCU and/or SCU sizes to the particular characteristics of the present picture. For instance, for some pictures being basically a uniform or homogenous background view larger LCU and SCU sizes could be preferred and leading to more efficient coding as compared to pictures with a lot of small details where smaller LCU and SCU sizes could be preferred.

In an embodiment, the LCU size and/or the SCU size are therefore determined during the encoding process in steps S40 and S41 of FIG. 8, such as based on the pixel values of the picture. A notification of the determined LCU size and/or a notification of the determined SCU size is then associated with the coded representation of the picture in step S43. The association of the notification(s) and the coded representation can be conducted according to various embodiments. For instance, the notifications can be included in the coded representation of the picture. An alternative is to include the notifications in a separate parameter set, such as a PPS or SPS that is included in or associated with the coded representation. In the latter case, the PPS or SPS could be provided out of band of the coded representation but in such a way that the decoder is able to identify which picture data the PPS or SPS belongs to. This could be solved by using picture or video frame/stream identifiers included in the PPS/SPS and the coded representation.

In the above presented embodiment, either the LCU size is determined for the picture, the SCU size or both the LCU size and the SCU size.

In alternative embodiments, the LCU and SCU sizes are predefined and fixed as mentioned above, thereby requiring less overhead since no notifications of the LCU/SCU size need to be transmitted together with the coded picture data. For most pictures this is fully acceptable and still achieves' sufficient coding efficiency and quality.

In these embodiments it could, however, be preferred to be able to adjust the hierarchical granularity for the picture, i.e. defining the smallest possible CU at which a slice start potentially can be aligned. This corresponds to a so-called addressable CU. Generally, a LCU can potentially be split down to the level of the SCU and not be split further. However, in some embodiments it could be advantageous to still limit the granularity at which the slice start positions can be aligned to a level above the SCU level. This is particular advantageous when a same encoder is used in different scenarios. For instance, in one case it may be important to be able to form slices that are very close to a specific size, such as close to the 1500 byte limit of Internet Protocol (IP) packets. However, in other cases no such size constraints are necessary, such in connection with content downloading.

For instance, the LCU size could be 128×128 pixels and the SCU size is 4×4 pixels. In this example, the coding constraints do not require very exact slice sizes so it is sufficient to restrict slice borders to 16×16 CUs. In this example, this limitation in granularity could be by signaling "max 3 splits" (128×128→64×64→32×32→16×16). In such a case, slice borders are possible before 128×128 CUs, i.e. LCU level (no split), 64×64 CUs (one split), 32×32 CUs (two splits) or 16×16 CUs (three splits) in decoding order.

Note though that the hierarchical granularity does not restrict the hierarchical splitting of LCUs into smaller coding units. Thus, even if the hierarchical granularity of a picture defines that the slice start positions can only be aligned with 16×16 CU borders, it is possible to hierarchically split such a 16×16 CU into four 8×8 CUs. However, the slice start position can then not be positioned at the address of one of the three 8×8 CUs inside the 16×16 CU having other addresses than the CU, i.e. the first 8×8 CU will in fact have the same address as the 16×16 CU.

Information of the hierarchical granularity determined for the picture in step S42 is then associated with the coded representation of the picture in step S43 to thereby be available during decoding of the coded picture. This association can be performed in the same way as for the LCU/SCU size notifications.

In FIG. 8, the steps S40, S41 and S42 has been illustrated together. However, these steps can be performed separately or together according to various embodiments. For instance, only the operation of step S40, step S41 or step S42 could be performed in addition to the association of the notification or information with the coded representation in step S43. In alternative embodiments, steps S40 and S41, steps S40 and S42, steps S41 and S42 or steps S40, S41 and S42 are performed with step S43.

FIG. 9 is a schematic illustration of an embodiment of a coded representation 50 of a picture. Generally the coded representation 50 comprises two main parts for each slice, a slice header 52 and coded data 54. The coded representation 50 is typically in the form of a sequence or stream of bits, though other symbol alphabets besides the binary alphabet could be used and are within the scope of the invention, such as hexadecimal or decimal alphabet. The slice header 52 typically comprises the address information of the first CU in the slice such as in the form of first_cu_in_slice. In particular embodiments additional information can be included in the slice header including, for instance, coding type of the slice and picture parameter set.

The coded data 54 then carries the coded picture data of the pixels in the slice together with the split coding unit flags discussed in the foregoing.

The coded representation 50 may optionally also comprise or otherwise be associated with a picture parameter set (PPS) and/or a sequence parameter set (SPS) 56 as previously mentioned. The PPS/SPS 56 could form a part of, the coded picture representation 50. In such a case, each coded picture representation 50 of a video stream could have a respective PPS and/or SPS field 56. In an alternative approach, not all such coded picture representations 50 of the video stream need to carry the PPS and/or SPS field 56. For instance, the first coded picture representation 50 of the video stream could include the PPS and/or SPS field 56 and then such fields are only included in another coded picture representation of the video stream if any of the parameters in the PPS and/or SPS field 56 are updated or changed. A further variant is to signal the PPS and/or SPS field 56 out of band with regard to the coded picture presentation 50. In such a case, the PPS and/or SPS field 56 could be sent separately from the coded picture representation 50 but in such a way that the decoder is able to identify to which video stream or coded picture representation the PPS and/or SPS field 56 belongs. This can be achieved by including a session, stream and/or picture identifier in both the coded picture representation 50 and in the PPS and/or SPS field 56.

Figure 10:
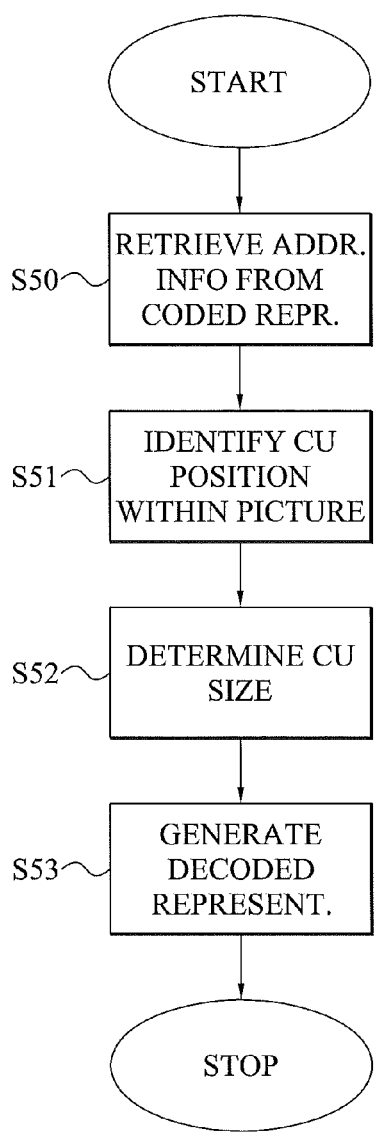
FIG. 10 is a flow diagram illustrating an embodiment of decoding a coded representation of a picture.

FIG. 10 is a flow diagram illustrating a method of processing or decoding a coded representation of a picture, such as generated according to the method illustrated in FIG. 1. The method starts in step S50 where address information is retrieved from the coded representation of the picture. In a particular embodiment, the address information is retrieved from a slice header portion 52 of the coded representation 50 as illustrated in FIG. 9. The address information is processed in a next step S51 to identify a position of a first CU of a slice within the picture based on the retrieved address information. The start of this slice in the picture further coincides with a border between the first CU and a preceding, according to a defined processing order, CU in the picture. This preceding CU, however, belongs to another slice of the picture but the first CU and the preceding CU are present within a same LCU of the picture. Hence, the start of the slice occurs inside a LCU and is aligned with the border between two adjacent, according to the defined processing order, CUs formed by hierarchically splitting the LCU into multiple smaller CUs.

The size of the first CU is determined in a next step S52 based at least partly on the address information retrieved in step S50. In more detail, the address information dictates the largest possible size in terms of number of pixels that the first CU can have. This means that the first CU can have a size equal to this largest possible size or a size smaller than the largest possible size. In the latter case, a split coding unit flag is further employed in addition to the address information in order to define the correct size of the first CU, which is further discussed herein.

Once the size of the first CU has been determined in step S52, a decoded representation of the pixel values of the pixels in the first CU is generated in step S53 based on the coded representation and based on the determined CU size and preferably the address information. Thus, the determined CU size defines the number of pixels the first CU comprises and the address information defines the position in the picture that this first CU occupies. The decoded representations of the pixel values are generated according to well known decoding techniques, such as inter- or intra-mode decoding. The decoded representations of the pixel values are generated based on the coded data found in the coded data portion 54 of FIG. 9.

The method then ends or continues by decoding remaining CUs and pixels of the slice.

Pixel value as used herein denotes any value of a pixel property assigned to a pixel. In typical implementations for HEVC the pixel value is a color value. Different color formats are known in the art and can be used according to the embodiments. For instance, a color value could comprise both luminance and chrominance components, typically one luminance value and two chrominance components. A pixel value could therefore be a luminance value of a pixel, a chrominance value of a pixel or indeed both luminance and chrominance values. Another example of a common color format is the so-called RGB format, which stands for Red-Green-Blue. A color value then comprises both a red, green and blue value. A pixel value could then be a RGB value, a red value, a green value or a blue value. Also variants of the RGB format, such as RGBA are known and can be used according to the embodiments.

In fact, the embodiments do not necessarily have to be limited to usage of color values as pixel values but can also be applied to other known pixel values including grayscale values, normal values, i.e. X, Y, Z coordinate values, etc.

The determination of the size of the CU in FIG. 10 is performed at least partly based on the retrieved address information. In some embodiments additional information is also employed besides the address information. This additional information is the previously mentioned split coding unit flag. For instance, the first CU can be associated with a split coding unit flag included in the coded representation of the picture, typically in the coded data portion. The value of the split coding unit flag is then employed together with the address information in order to define the correct size of the first CU. Thus, if the split coding unit flag is set to a defined value, preferably one, the size of the first CU is smaller than the size of the largest possible CU that can occupy the position within the picture defined based on the address information, see FIG. 3B. However, if the split coding unit flag is set to another defined value, preferably zero, the size of the first CU is equal to the size of the largest possible CU that can occupy the position in the picture defined by the address information, see FIG. 3A.

FIG. 11 illustrates this concept. The method continues from step S51 in FIG. 10 and in a next step S60 a split coding unit flag associated with the first CU is retrieved from the coded representation. The method then continues to step S52 of FIG. 10, where the size of the first CU is determined based on the address information and based on the value of the retrieved split coding unit flag.

It is possible that the first CU is associated with multiple split coding unit flags. For instance, if the size of the largest possible CU is 32×32 pixels, whereas the size of the first CU is 8×8 pixels with a LCU size and SCU size of 64×64 pixels and 8×8 pixels, the code would be:

split_coding_unit_flag=1 // 32×32 CU is divided into 16×16 CUs split_coding_unit_flag=1 // first 16×16 CU is split into SCUs, no further split coding unit flag is needed since we have now reached the target size of the first CU and this is also the SCU size implying that now further splitting is possible In some embodiments, the size of the first CU can be determined based on said address information without using any split coding unit flag as additional information. This is possible when the size of the largest possible CU that can occupy the position within the picture defined based on the address information is equal to the SCU size. In such a case, it is not possible to split this largest possible CU further since it is in fact a SCU.

If the address information comprises two coordinate representations or these coordinate representations can be generated or calculated from the address information as previously mentioned, the method steps as illustrated in FIG. 12 are preferably conducted. The method then continues from step S50 to step S70 where a first coordinate representation of the retrieved address information is employed to identify the position within the picture of the LCU in which the first CU is present. The first coordinate representation is then preferably relative a global picture origin, such as the upper left corner of the picture. A second coordinate representation of the address information is employed in step S71 to identify the position of the first CU within the LCU. The second coordinate representation then defines this position relative a local LCU origin, such as the upper left corner of the LCU. The method then continues to step S52 of FIG. 10.

If the address information instead comprises a single coordinate representation the position of the first CU within the picture can be determined in a single step and does not require a two-step procedure as in FIG. 12.

Figure 13:
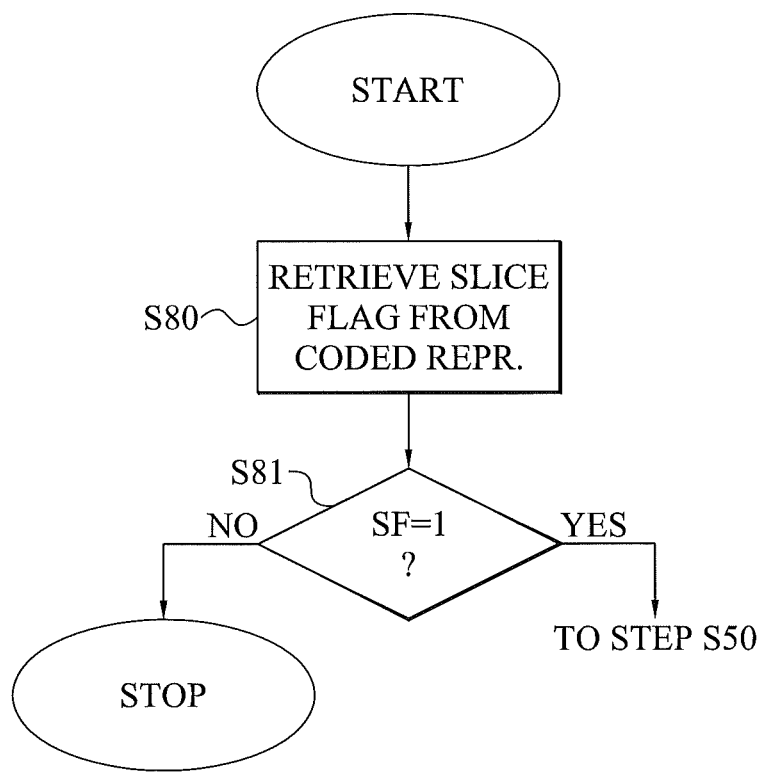
FIG. 13 is a flow diagram illustrating additional steps of the method in FIG. 10 according to an embodiment.

FIG. 13 is a flow diagram illustrating additional embodiments of the method of processing or decoding a coded representation of a picture. In an embodiment, a slice flag is included in the coded representation of the picture, such as SPS or PPS of or associated with the coded representation, and employed to differentiate between pictures having a single slice and pictures consisting of multiple slices. In such a case, this slice flag is retrieved in step S80 from the coded representation and its value is investigated in a next step S81. If the slice flag has a defined value, such as 1, it only comprises a single slice so no identification of any first CU and slice start within a LCU in the picture is necessary. The method then continues by decoding the pixel values of the slice. If the slice flag instead has another defined value, such as 0, the picture comprises multiple slices and the start of such a slice within the picture needs to be determined. The method then continues to step S50 of FIG. 10.

Figure 14:
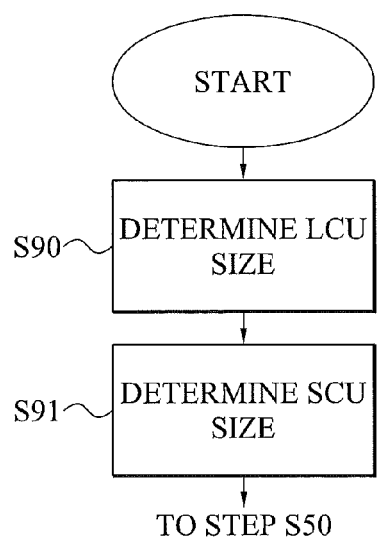
FIG. 14 is a flow diagram illustrating additional steps of the method in FIG. 10 according to yet an embodiment.

FIG. 14 schematically illustrates additional and optional step of the processing method in FIG. 10. These steps are performed if the LCU size and/or the SCU size are not fixed but rather set during encoding. Step S90 determines the LCU size based on a notification thereof included in or associated with the coded representation of the picture, such as in a slice header or in a global header for the picture (PPS or SPS). Correspondingly, if the SCU size is not fixed step S91 determines the SCU size based on a notification thereof included in or associated with the coded representation of the picture. Depending on the particular embodiment, the method can be conducted according to step S90, step S91 or both steps S90 and S91 before proceeding further to step S50 of FIG. 10. If, however, both the LCU and SCU sizes are predefined and fixed steps S90 and S91 can be omitted.

Figure 15:
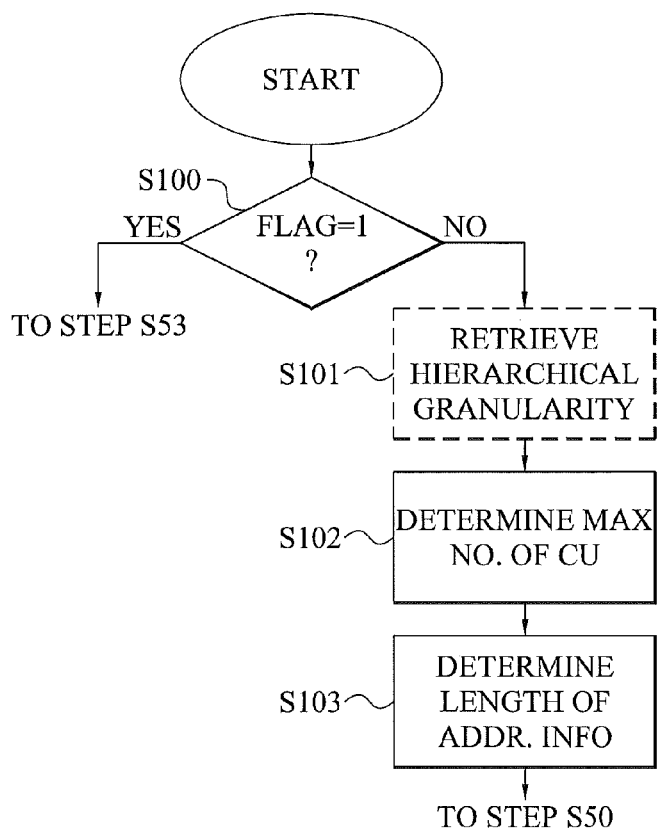
FIG. 15 is a flow diagram illustrating additional steps of the method in FIG. 10 according to an embodiment.

FIG. 15 is a flow diagram illustrating additional optional steps of the processing method in FIG. 10. In an optional embodiment, a defined bit of the coded representation is employed to indicate whether the current slice is the first slice in the picture. If this bit at defined bit position in the coded representation has a defined value, such as 1, then the present slice is the first slice, and if it has another defined value, such as 0, the present slice is not the first slice in the picture. The explicit signaling of the first slice is advantageous since then no address information is needed for the first slice. This saves bits since no address information will be needed for the first slice but merely for any second and remaining slices in the picture. This saving in bits comes at the cost of one additional flag bit per slice in the picture but this added overhead will generally be much smaller as compared to the bit length of the address information that is no longer needed for the first slice.

Thus, in an optional embodiment the value of this start flag retrieved from the coded representation is investigated in step S100. If the start flag value is 1 the present slice is the first slice in the picture and the method can proceed directly to step S53 of FIG. 10, where the decoded representations of the pixel values of the pixels in the slice are generated. If the start flag is not set to 1 the method instead continues to step S101.

In the optional step S101 information of a hierarchical granularity for the picture is retrieved from the coded representation. This hierarchical granularity restricts, as previously discussed herein, that a slice can only start on a granularity-aligned address. Information of such hierarchical granularity is typically only included in or associated with the coded representation if the encoder wants to limit the slice start positions to a higher level than the SCUs. If there is no need for such a limitation no information of the hierarchical granularity is provided in the coded representation and step S101 can be omitted.

A next step S102 determines a maximum number of slice start positions or addressable CUs in the picture based on information of the size of the picture and information of the hierarchical granularity. The picture size is typically included in the coded representation or could be sent as additional information. The picture size information is generally expressed as the width and height in terms of the number of pixels, although other ways are possible and within the scope of the embodiments, such as one of width and height and an aspect ratio in number of pixels.

The maximum number of slice start positions, N, in the picture is then typically obtained by dividing the picture width and height with the side length of the addressable CU. For instance, a picture of size 1280×960 pixels will, with a SCU size of 8×8 pixels, comprise a maximum number of 160×120=19200 slice start addresses, whereas if the hierarchical granularity limits slice start to CUs with 16×16 pixels the picture comprises 80×60=4800 slice start positions.

The length of the address information allowing identification of the first CU in a slice of the picture is then determined in step S103 based on the maximum number of slice start positions as calculated in step S102. In an embodiment, the number of bits to parse in the coded representation to determine the slice address is $\log_2(N)$ or $\log_2(N-1)$, with N being the determined maximum number of slice start positions from step S102. Both these two options work well and can be used but once one of them has been selected it will be consistently employed by the decoder for decoding the picture. The method then continues to step S50 of FIG. 10, where the bits of the address information are read from the coded representation.

FIG. 16 is a schematic block diagram illustrating an embodiment of a device 100 for coding a picture according to an embodiment. The device 100 comprises a CU splitter 110 configured to hierarchically split a LCU of a picture into multiple CUs having respective sizes that are smaller than the size of the LCU as previously described. Thus, in a preferred embodiment the hierarchical splitting is performed in a quadtree fashion by splitting the LCU into four equally sized CU and then selecting, unless a size of a CU is equal to the SCU size, whether to recursively split the CU further into four equally sized smaller CUs to thereby form a quadtree structure of CUs.

A slice start identifier 120 is configured, in an embodiment, to identify a start of a slice within the picture to coincide with a border between a first CU and a preceding CU of the LCU. Thus, the start of the slice occurs, in this embodiment, inside the LCU. The preceding CU precedes the first CU when traveling along the multiple CUs of the LCU in a defined processing order, such as a raster scan order or the Morton order.

The device 100 also comprises an address information generator 130 implemented to generate address information that allows identification of the first CU and its position within the picture. The address information not only defines the position of the first CU but also the size of the largest possible CU that can occupy this position in the picture. A representation manager 140 is configured to include the address information generated by the address information generator 130 in a coded representation of the picture. The coded representation also comprises coded data representing the pixel values of the pixels in the slice and the picture in a compressed form such as according to an intra or inter coding mode.

The address information generated by the address information generator 130 could be the pixel position in the picture occupied by the first pixel in the first CU. Alternatively, a picture is divided into a number of SCUs and the address information is then based on the SCU number coinciding with the position of the first CU in the picture. For instance, a 1280×960 picture can have 19200 8×8 pixels SCUs so the address information could then be a number from 0 up to 19200−1=19199.

In an alternative embodiment, the address information generator 130 is configured to generate a first representation of the coordinates of the position of the LCU within the picture. This first representation could be the x, y coordinates of the LCU expressed in LCU units. Alternatively, the first representation could be a single value representing the LCU number having the same position as the start of the LCU within the picture. In the latter case, the picture is read in a defined order starting from a fixed position, typically the upper left corner. The defined order could be a raster scan order or the Morton order.

The address information generator 130 additionally generates a second representation of the coordinates of the position of the first CU within the LCU. This second representation could be in the same format as the first representation, i.e. having two coordinates or a single value. The second representation can be in pixel units, SCU units or, if the hierarchical granularity is limited to a higher level than the SCUs, CU units. A difference is now that the origin of the coordinates is the start of the LCU and not the start of the picture. The same processing order could be used as for the first representation when numbering the SCU or CU units. Alternatively, a different order can be used, such as Morton order if the LCUs are scanned in raster scan order.

In a further alternative, the address information generator 130 generates address information that can be used by a decoder to calculate the first and second coordinate representations.

In an embodiment, the device 100 comprises a split flag manager 150 configured to set a split coding unit flag associated with the LCU to 1 or some other defined value to indicate that the LCU is hierarchically split into multiple CUs. The LCU is typically associated with multiple such split coding unit flags to define whether the formed first level CUs are further split into second or further levels CUs or not split further. The representation manager 140 is then configured to include the set split coding unit flags in the coded representation of the picture.

In similarity to the LCU, the split flag manager is configured to set a first split coding unit flag of the slice to 1 or some other defined value if the size of the first CU in the slice is smaller than the size of the largest possible CU that can occupy the start position in the slice. If the size of the first CU is equal to the size of the largest possible CU that can occupy the start position the first split coding unit flag is instead set to 0 or some other defined value. However, if the size of the first CU is equal to the size of the SCU no first split coding unit flag is in fact needed and can thereby be omitted. The representation manager 140 includes the first split coding unit flag, if employed, in the coded representation of the picture.

The split flag manager 150 correspondingly sets split coding unit flags for the remainder CUs in the LCU and indeed for the slice and picture to indicate whether a CU is split into four equally sized smaller CUs or if it is not split further into smaller CUs. The representation manager 140 then includes these split coding unit flags in the coded representation.

An optional size determiner 160 can be included in the device 100 for determining the size in terms of number of pixels of the SCU and/or the LCU for the picture. In such a case, the representation manager 140 is configured to include or associate notification(s) of the determined SCU and/or LCU size in or with the coded representation of the picture. In alternative embodiments, the SCU and LCU sizes are fixed and known both by the device 100 and a corresponding decoding device and therefore do need to be determined or signaled in the coded representation.

In an optional embodiment, a slice flag manager 170 is implemented in the device 100 for setting a slice flag to 1 or some other defined value to indicate that the picture comprises multiple slices and therefore indicate that the start of the slices need to be determined during decoding. The representation manager 140 then includes this slice flag in the coded representation of the picture.

If the slice start positions should be limited to a CU level above the SCU level the CU splitter 110 preferably generates information of the hierarchical granularity to employ for the current picture. The representation manager 140 includes this information of the hierarchical granularity in the coded representation of the picture or associates the information with the coded representation.

In an optional embodiment, the slice flag manager 170 additionally sets a start flag for each slice in the picture. In such a case, the start flag of the first slice in the picture has a first defined value, such as one, to indicate that that this slice is the first slice in the picture. No address information thereby needs to be generated for this first slice by the address information generator 130. In clear contrast, the first slice has a predefined start position, such as upper left corner of the picture. The start flags for the remaining slice(s) in the picture are set to a second defined value, such as zero, to indicate that this/these slice/slices is/are not the first slice and thereby needs to have generated address information.

The device 100 could be implemented at least partly in software. In such an embodiment, the device 100 is implemented as a computer program product stored on a memory and loaded and run on a general purpose or specially adapted computer, processor or microprocessor, such as a central processing unit (CPU). The software includes computer program code elements or software code portions effectuating the operation of at least the CU splitter 110, the slice start identifier 120, the address information generator 130 and the representation manager 140. Computer program code elements effectuating the operation of the split flag manager 150, the size determiner 160 and/or the slice flag manager 170 may also be included in the software. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 100 include single instruction multiple data (SIMD) code.

Alternatively the device 100 can be implemented in hardware. There are numerous variants of circuitry elements that can be used and combined to achieve the functions of the units of the device 100. Such variants are encompassed by the embodiments. Particular examples of hardware implementation of the device 100 is implementation in digital signal processor (DSP) hardware and integrated circuit technology, including both general-purpose electronic circuitry and application-specific circuitry.

FIG. 17 is a schematic block diagram of a device for decoding a coded representation of a picture, such as a coded representation generated by the device illustrated in FIG. 16. The device 200 comprises an address information retriever 210 configured to retrieve address information from the coded representation of the picture. This address information is employed by a position identifier 220 to identify a position of a first CU of a slice within the picture. The start of this slice within the picture coincides with a border between the first CU and a preceding CU belonging to the same LCU in the picture.

A CU size determiner 230 is implemented to determine the size of the first CU in terms of the number of pixels based at least partly on the address information. The address information then defines the size of the largest possible CU that can occupy the position defined by the address information in the picture. In an embodiment, the size of the first CU is determined by the CU size determiner 230 based solely on the address information. This is possible when the size of the first CU is equal to the SCU size and no further CU splitting is possible. In other embodiments, the CU size determiner 230 additionally uses one or more split coding unit flags included in the coded representation together with the address information to determine the size of the first CU. If a single split coding unit flag is equal 0 or some other defined value, the size of the first CU is equal to the size of the largest CU that can occupy the position within the picture defined by the address information. If the split coding unit flag is instead equal to 1 or some other defined value, the size of the first CU is smaller than, preferably one quarter of, the size of the largest possible CU that can occupy the position within the picture defined by the address information.

For instance, if the size of the largest possible CU at the starting coordinate is 32×32 pixels (with a LCU size of 64×64 pixels and a SCU size of 8×8 pixels) the split coding unit flag(s) would be:
split_coding_unit flag=0
for a 32×32 pixels size of the first CU
split_coding_unit_flag=1
split_coding_unit_flag=0
for a 16×16 pixels size of the first CU
split_coding_unit_flag=1
split_coding_unit_flag=1
for an 8×8 pixels size of the first CU A representation generator 240 of the device 200 generates a decoded representation of the pixel values of the pixels in the first CU based on the coded representation and based on the size of the first CU as determined by the CU size determiner 230. Thus, the size is employed in order to determine how many pixels the first CU comprises. The coded data of this number of pixels is then read from the coded representation of the picture and employed by the representation generator 240 to generate the pixel values according to known techniques, such as intra or inter mode decoding.

In an embodiment, the SCU and LCU sizes are fixed and therefore known at the device 200. In an alternative approach, the SCU and/or LCU size is determined by the coding device and information thereof is thereby included in or associated with the coded representation of the picture. In such a case, the device 200 preferably comprises a size determiner 250 configured to determine the SCU and/or LCU size based on a respective notification retrieved from the coded representation.

An optional split manager 260 can be included in the device 200 for retrieving and investigating the value of a slice flag included in the coded representation of the picture. The value of this slice flag is then employed by the device 200 to determine whether the picture comprises a single slice or comprises multiple slices. It is only in the latter case that address information is needed in order to identify the start of a slice and the first CU of such a slice.

The address information retrieved from the coded representation by the address information retriever 210 can be a single fixed length code or a variable length code as previously discussed. It is also possible to use address information comprising two coordinate representations or two such coordinate representations can be calculated from the address information. In such a case, the position identifier 220 is configured to identify the position of the LCU within the picture based on the first coordinate representation and relative a picture global origin. The position of the first CU and thereby the start of the slice within the identified LCU is then identified based on the second coordinate representation and relative a local LCU origin.

In an optional embodiment, the device 200 comprises a slice start position (SSP) number determiner 280 configured to determine a maximum number of slice start positions or addressable CUs in the picture. The slice start position number determiner 280 performs this determination based on information of the size of the picture as retrieved from the coded representation or associated thereto and based on information of a smallest allowable size of an addressable CU for the picture. The latter is typically the SCU size that could be fixed and thereby known at the device 200 or be retrieved from the coded representation of the picture by the size determiner 250. However, if hierarchical granularity information is determined for the picture and defines that the slice start position is limited to a CU level above the SCU level, the size of the addressable CU is then obtained from the hierarchical granularity information. This information is then employed by the coding unit number determiner 280 to determine the maximum number of slice start positions.

The address information retriever 210 calculates the length of the address information, in particular if a fixed length code is used for address information, based on the determined maximum number of slice start positions N, preferably as $\log_2(N)$ or $\log_2(N-1)$.

In an embodiment, a slice manager 270 is employed in order to retrieve a start flag associated with the slice and present in the coded representation of the picture. If this start flag has a defined value, such as 1, the present slice to decode is the first slice of the picture and therefore no address information needs to be retrieved and employed in order to identify the start position of the slice. In clear contrast, this start position is predefined and preferably equal to the upper left corner of the picture. If the start flag has another defined value, such as 0, the slice is not the first slice in the picture and address information is needed in order to identify its start within the picture. The address information retriever 210 then retrieves $\log_2(N)$ or $\log_2(N-1)$ bits from the coded representation and uses these bits as the address information of the first CU and the start of the slice within the picture.

The device 200 could be implemented at least partly in software. In such an embodiment, the device 200 is implemented as a computer program product stored on a memory and loaded and run on a general purpose or specially adapted computer, processor or microprocessor, such as a central processing unit (CPU). The software includes computer program code elements or software code portions effectuating the operation of at least the address information retriever 210, the position identifier 220, the CU size determiner 230 and the representation generator 240. Computer program code elements effectuating the operation of the size determiner 250, the split manager 260, the slice manager 270 and/or the CU number determiner 280 may also be included in the software. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the device 200 include single instruction multiple data (SIMD) code.

Alternatively the device 200 can be implemented in hardware. There are numerous variants of circuitry elements that can be used and combined to achieve the functions of the units of the device 100. Such variants are encompassed by the embodiments. Particular examples of hardware implementation of the device 200 is implementation in digital signal processor (DSP) hardware and integrated circuit technology, including both general-purpose electronic circuitry and application-specific circuitry.

Figure 18:
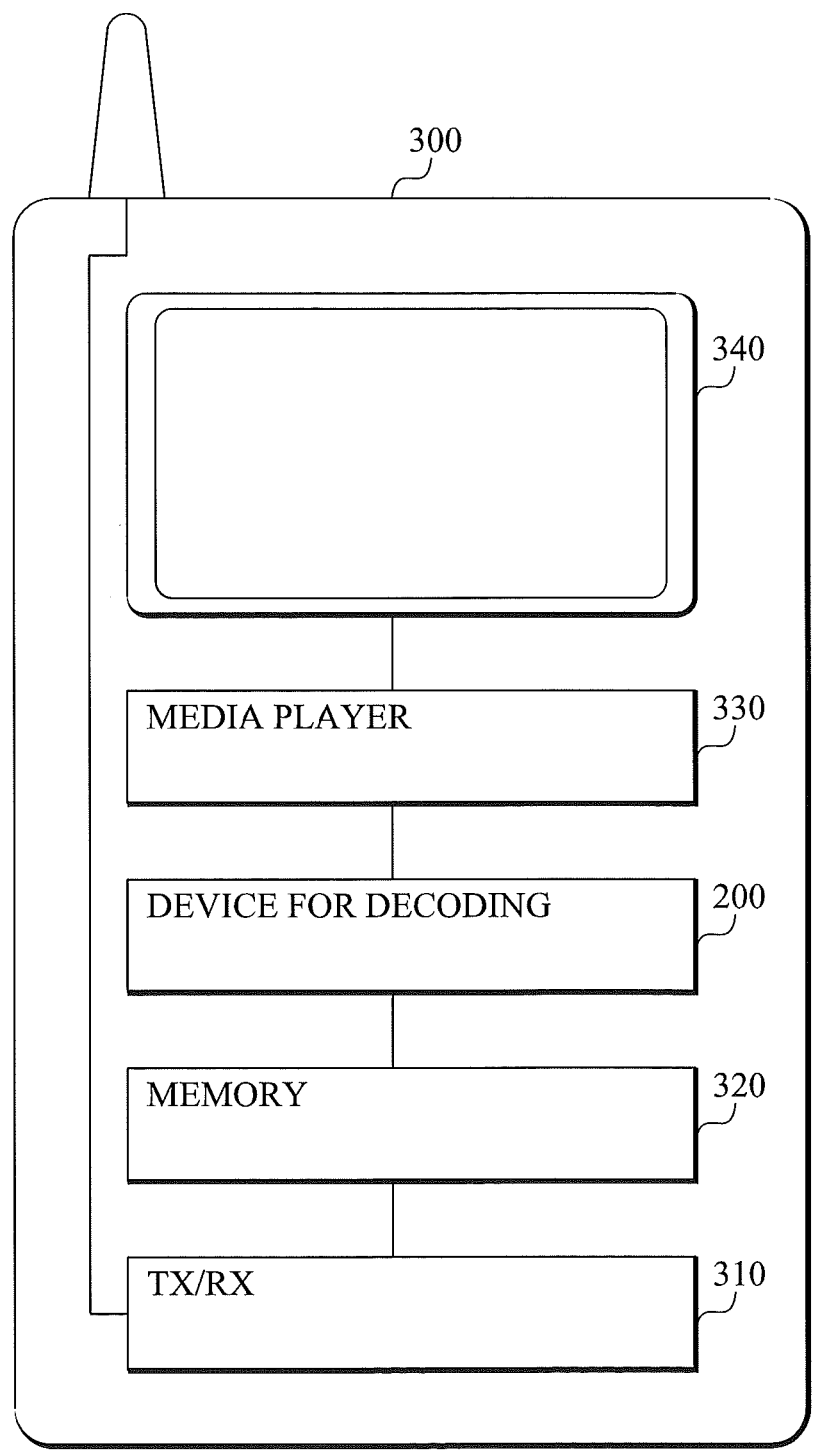
FIG. 18 is a schematic block diagram of a media terminal according to an embodiment.

FIG. 18 is a schematic block diagram of a media terminal 300 housing a device 200 for decoding a coded representation of a picture. The media terminal 300 can be any device having media decoding functions that operates on an encoded bit stream, such as a video stream of encoded video frames to thereby decode the video frames and make the video data available. Non-limiting examples of such devices include mobile telephones and other portable media players, computers, decoders, game consoles, etc. The media terminal 300 comprises a memory 320 configured to a coded representation of a picture, such as encoded video frames. The coded representation can have been generated by the media terminal 300 itself. In such a case, the media terminal 300 preferably comprises a media engine or recorder together with a connected encoder, such as the device for coding a picture of FIG. 16. Alternatively, the coded representations are generated by some other device and wirelessly transmitted or transmitted by wire to the media terminal 300. The media terminal 300 then comprises a transceiver 310 (transmitter and receiver) or input and output port to achieve the data transfer.

The coded representation is brought from the memory 320 to the device 200 for decoding, such as the device illustrated in FIG. 17. The device 200 then decodes the coded representation into a decoded picture or as decoded video frames. The decoded data is provided to a media player 330 that is configured to render the decoded picture data or video frames into data that is displayable on a display or screen 340 of or connected to the media terminal 300.

In FIG. 18, the media terminal 300 has been illustrated as comprising both the device 200 for decoding and the media player 330. This should, however, merely be seen as an illustrative but non-limiting example of an implementation embodiment for the media terminal 300. Also distributed implementations are possible where the device 200 and the media player 330 are provided in two physically separated devices are possible and within the scope of media terminal 300 as used herein. The display 340 could also be provided as a separate device connected to the media terminal 300, where the actual data processing is taking place.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of coding a picture comprising multiple slices and being composed of multiple largest coding units having a selected size in terms of number of pixels, said method comprising:
   hierarchically splitting a largest coding unit of said multiple largest coding units into multiple coding units having respective sizes that are smaller than said selected size;
   defining a start of a slice in said picture to coincide with a border between a first coding unit of said multiple coding units and a preceding, according to a defined processing order, coding unit of said multiple coding units;
   selecting the first coding unit and the preceding coding unit to have different sizes in terms of number of pixels. wherein the first coding unit and the preceding coding unit belong to a same largest coding unit:
   generating address information allowing identification of said first coding unit, said address information defining a position of said first coding unit within said picture and a size of a largest possible coding unit that can occupy said position in said picture; and
   including said address information in a coded representation of said picture.

2. The method according to claim 1, further comprising:
   determining the coordinates of a position of said largest coding unit within said picture; and
   determining the coordinates of a position of said first coding unit within said largest coding unit, wherein generating said address information comprises generating said address information based on said coordinates of said position of said largest coding unit and said coordinates of said position of said first coding unit.

3. The method according to claim 1, further comprising:
   setting a first split coding unit flag of said slice to a first defined value in response to when a size of said first coding unit is smaller than said size of said largest possible coding unit; and including said first split coding unit flag in said coded representation.

4. The method according to claim 1, further comprising:
setting a first split coding unit flag of said slice to a second defined value in response to when a size of said first coding unit is equal to said size of said largest possible coding unit and said size of said largest possible coding unit is larger than a defined size of a smallest coding unit; and
including said first split coding unit flag in said coded representation.

5. A method of decoding a coded representation of a picture comprising multiple slices and being composed of multiple largest coding units having a selected size in terms of number of pixels, said method comprising:
retrieving address information from said coded representation of said picture;
identifying, based on said address information, a position of a first coding unit of a slice in said picture, wherein a start of said slice in said picture coincides with a border between said first coding unit and a preceding, according to a defined processing order, coding unit, said first coding unit and said preceding coding unit belong to a same largest coding unit of said multiple largest coding units, wherein the first coding unit and the preceding coding unit are selected to have different sizes in terms of number of pixels;
determining a size of said first coding unit based at least partly on said address information; and
generating a decoded representation of pixel values of the pixels in said first coding unit based on said coded representation and said size of said first coding unit.

6. The method according to claim 5, wherein determining said size of said first coding unit comprises:
determining said size of said first coding unit based on said address information and a value of a split coding unit flag provided in said coded representation and assigned to said first coding unit,
wherein said split coding unit flag being a first defined value in response to when said size of said first coding unit is smaller than a size of a largest possible coding unit that can occupy a position within said picture defined based on said address information, and
wherein said split coding unit flag being a second defined value in response to when said size of said first coding unit is equal to said size of said largest possible coding unit that can occupy said position within said picture defined based on said address information.

7. The method according to claim 5, wherein determining said size of said first coding unit comprises determining said size of said first coding unit based solely on said address information in response to when a size of a largest possible coding unit that can occupy a position within said picture defined based on said address information is equal to a size of a smallest coding unit.

8. The method according to claim 5, wherein identifying said position of said first coding unit comprises:
identifying a position of said largest coding unit within said picture based on said address information; and
identifying a position of said first coding unit within said largest coding unit based on said address information.

9. The method according to claim 5, further comprising retrieving a start flag from said coded representation, wherein retrieving said address information is performed in response to when said start flag is equal to a second defined value indicating that said slice is not a first slice in said picture.

10. A device for coding a picture comprising multiple slices and being composed of multiple largest coding units having a selected size in terms of number of pixels, said device comprising:
a coding unit splitter configured to hierarchically split a largest coding unit of said multiple largest coding units into multiple coding units having respective sizes that are smaller than said selected size;
a slice start identifier configured to identify a start of a slice in said picture to coincide with a border between a first coding unit of said multiple coding units and a preceding, according to a defined processing order, coding unit of said multiple coding units, wherein the first coding unit and the preceding coding unit belong to a same largest coding unit, and wherein the first coding unit and the preceding coding unit are selected to have different sizes in terms of number of pixels;
an address information generator configured to generate address information allowing identification of said first coding unit, said address information defining a position of said first coding unit within said picture and a size of a largest possible coding unit that can occupy said position in said picture; and
a representation manager configured to include said address information in a coded representation of said picture.

11. The device according to claim 10, wherein said address information generator is configured to:
i) determine the coordinates of a position of said largest coding unit within said picture;
ii) determine a second representation of the coordinates of a position of said first coding unit within said largest coding unit, and
iii) generate said address information based on said coordinates of said position of said largest coding unit and said coordinates of said position of said first coding unit.

12. The device according to claim 10, further comprising a split flag manager configured to set a first split coding unit flag of said slice to a first defined value in response to when a size of said first coding unit is smaller than said size of said largest possible coding unit, wherein said representation manager is configured to include said first split coding unit flag in said coded representation.

13. The device according to claim 10, further comprising:
a split flag manager configured to set a first split coding unit flag of said slice to a second defined value in response to when a size of said first coding unit is equal to said size of said largest possible coding unit and said size of said largest possible coding unit is larger than a defined size of a smallest coding unit,
wherein said representation manager is configured to include said first split coding unit flag in said coded representation.

14. The device according to claim 10, wherein said coding unit splitter is configured to recursively split said largest coding unit in a quadtree fashion by splitting said largest coding unit into four equally sized coding units to form a quadtree structure of coding units when size of a coding unit is not equal to a defined size of a smallest coding unit.

15. The device according to claim 14, further comprising a split flag manager configured to:
i) set a split coding unit flag for a coding unit to a first defined value in response to when said coding unit is split into four equally sized coding units; and
ii) set, unless a size of a coding unit is equal to said defined size of said smallest coding unit, said split coding unit flag for said coding unit to a second defined value in response to when said coding unit is not split into four equally sized coding units, wherein said representation manager is configured to include said split coding unit flag in said coded representation.

16. The device according to claim 14 further comprising a size determiner configured to determine said defined size of said smallest coding unit, wherein said representation manager is configured to associate a notification of said defined size to said coded representation.

17. The device according to claim 10, further comprising a size determiner configured to determine said selected size of said largest coding unit, wherein said representation manager is configured to associate a notification of said selected size at said coded representation.

18. The device according to claim 10, further comprising a slice flag manager configured to set a slice flag to a first defined value to indicate that said picture comprises said multiple slices, wherein said representation manager is configured to associate said slice flag to said coded representation.

19. A device for decoding a coded representation of a picture comprising multiple slices and being composed of multiple largest coding units having a selected size in terms of number of pixels, said device comprising:
   an address information retriever configured to retrieve address information from said coded representation of said picture;
   a position identifier configured to identify, based on said address information, a position of a first coding unit of a slice in said picture, wherein a start of said slice in said picture coincides with a border between said first coding unit and a preceding, according to a defined processing order, coding unit, said first coding unit and said preceding coding unit belong to a same largest coding unit of said multiple largest coding units, wherein the first coding unit and the preceding coding unit are selected to have different sizes in terms of number of pixels;
   a coding unit size determiner configured to determine a size of said first coding unit based at least partly on said address information; and
   a representation generator configured to generate a decoded representation of pixel values of the pixels in said first coding unit based on said coded representation and said size of said first coding unit determined by said coding unit size determiner.

20. The device according to claim 19, wherein:
said coding unit size determiner is configured to determine said size of said first coding unit based on said address information and a value of a split coding unit flag provided in said coded representation and assigned to said first coding unit,
said split coding unit flag being a first defined value in response to when said size of said first coding unit is smaller than a size of a largest possible coding unit that can occupy a position within said picture defined based on said address information; and
said split coding unit flag being a second defined value in response to when said size of said first coding unit is equal to said size of said largest possible coding unit that can occupy said position within said picture defined based on said address information.

21. The device according to claim 19, wherein said coding unit size determiner is configured to determine said size of said first coding unit based solely on said address information in response to when a size of a largest possible coding unit that can occupy a position within said picture defined based on said address information is equal to a size of a smallest coding unit.

22. The device according to claim 21, further comprising a size determiner configured to determine said defined size of said smallest coding unit based on a notification of said defined size associated with said coded representation.

23. The device according to claim 19, wherein said position identifier is configured to:
   i) identify a position of said largest coding unit within said picture based on said address information; and
   ii) identify a position of said first coding unit within said largest coding unit based on said address information.

24. The device according to claim 19, further comprising a size determiner configured to determine said selected size of said largest coding unit based on a notification of said selected size associated with said coded representation.

25. The device according to claim 19, further comprising a slice manager configured to determine that said picture comprises said multiple slices based on a slice flag associated with said coded representation.

26. The device according to claim 19, further a slice manager configured to retrieve a start flag from said coded representation, wherein said address information retriever is configured to retrieve said address information from said coded representation in response to when said start flag is equal to a second defined value indicating that said slice is not a first slice in said picture.

27. A media terminal comprising:
   a memory storing a coded representation of a picture comprising multiple slices and being composed of multiple largest coding units having a selected size in terms of number of pixels; and
   a device for decoding said coded representation according to claim 19.

* * * * *

UNITED STATES PATENT AND TRADEMARK OFFICE
CERTIFICATE OF CORRECTION

PATENT NO.        : 8,923,394 B2                                     Page 1 of 2
APPLICATION NO.   : 13/144351
DATED             : December 30, 2014
INVENTOR(S)       : Priddle et al.

It is certified that error appears in the above-identified patent and that said Letters Patent is hereby corrected as shown below:

On the title page item 56

On Page 2, under "OTHER PUBLICATIONS", in Column 1, Line 8, delete "Subsetl:" and insert -- Subset1: --, therefor.

On Page 2, under "OTHER PUBLICATIONS", in Column 1, Line 14, delete "nr.12," and insert -- no. 12, --, therefor.

In the drawings

In Fig. 18, Sheet 8 of 8, delete "  " and insert --  --, therefor.

In the specification

In Column 2, Lines 64-65, delete "information," and insert -- information. --, therefor.

In Column 8, Line 23, delete "hierarchical," and insert -- hierarchical --, therefor.

In Column 11, Lines 11-23, delete "The address.................info=C=1-2$^P$."  and insert the same at Line 12, as a new paragraph.

In Column 12, Line 2, delete "achieves'" and insert -- achieves --, therefor.

In Column 13, Line 7, delete "part of," and insert -- part of --, therefor.

Signed and Sealed this
Twenty-ninth Day of March, 2016

Michelle K. Lee
*Director of the United States Patent and Trademark Office*

CERTIFICATE OF CORRECTION (continued)
U.S. Pat. No. 8,923,394 B2

In the claims

In Column 22, Line 44, in Claim 1, delete "pixels." and insert -- pixels, --, therefor.

In Column 22, Line 46, in Claim 1, delete "unit:" and insert -- unit; --, therefor.

In Column 23, Line 58, in Claim 8, delete "comprises;" and insert -- comprises: --, therefor.

In Column 25, Line 5, in Claim 16, delete "claim 14" and insert -- claim 14, --, therefor.

In Column 26, Line 36, in Claim 26, delete "further" and insert -- further comprising --, therefor.